Oct. 22, 1929.   N. BRAIBANT   1,732,397
GRADOMETER
Filed Sept. 15, 1923   2 Sheets-Sheet 1

Inventor:
Nestor Braibant.
Attorney.

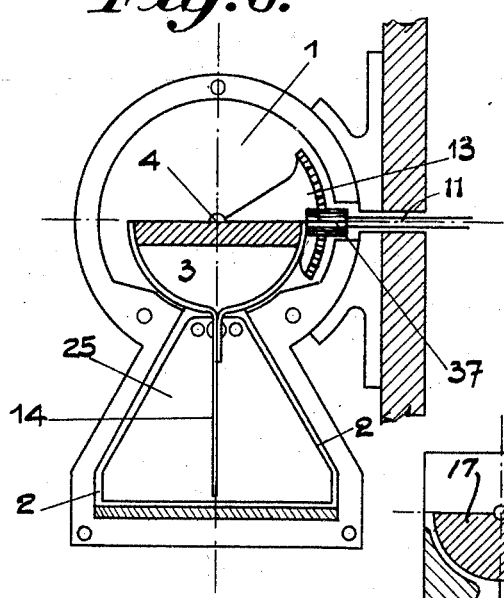
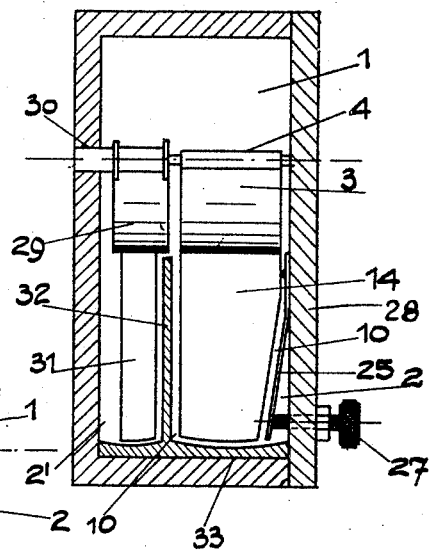
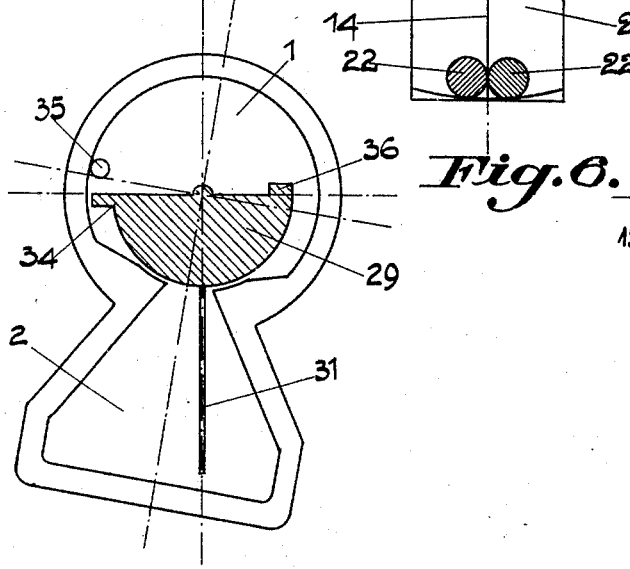
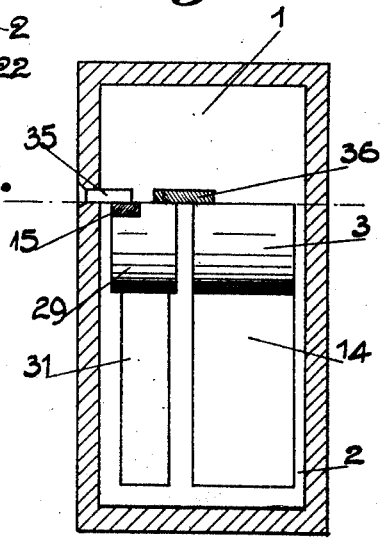

Patented Oct. 22, 1929

1,732,397

UNITED STATES PATENT OFFICE

NESTOR BRAIBANT, OF WOLUWE ST. PIERRE, BELGIUM

GRADOMETER

Application filed September 15, 1923, Serial No. 662,918, and in Belgium July 11, 1922.

The present invention relates to gradometers intended to indicate the longitudinal inclinations of roads on a conventional scale and applicable to any vehicles, particularly motor cars and comprising a receptacle secured to the instrument board of the car, at right angles to the axis thereof, said receptacle containing a pendulum keyed on a rotary suspension shaft swinging in bearings mounted on the walls of the recipient, the swinging amplitudes of the pendulum corresponding to the longitudinal inclinations of the road, said oscillations being transmitted to a hand or index movable in front of a suitably graduated dial.

The oscillations of such pendulums are not only influenced by the longitudinal inclinations of the roads; other causes, such as starting, sudden stop and braking, shocks caused by stones or the like, interfere with the correct indications of the inclinations on the road.

The present invention has for its object to provide a gradometer in which any oscillations of the pendulum, other than those produced by the inclinations of the road, are substantially eliminated.

In the gradometer according to the present invention, the pendulum is of such shape that the distance between its centre of gravity and the suspension shaft of same is as small as possible.

It is a known fact that of two pendulums of equal mass or weight and the centres of gravity of which are at different distances from the suspension shaft, the pendulum wherein this distance is the shortest will be less influenced by the motions arising of the vehicle proper and that such pendulum follows more quickly and correctly the variations of inclinations of the road than a pendulum wherein this distance is greater.

With this object in view, the heavy upper portion of the pendulum keyed on its rotary suspension shaft is located in the upper compartment of a receptacle, the lower compartment of which is filled with liquid, both compartments intercommunicating in such a manner that any spurting of the liquid into the upper compartment is prevented. The lower portion of the pendulum, formed by a thin blade or pallet, dipping into the liquid filling the lower compartment, exerts a braking action upon the pendulum.

The liquid (oil, glycerine or the like) is preferably prevented from substantial movement within the container. Obviously, a liquid freely moving in the container is unable to exert a satisfactory braking action on the pendulum.

Furthermore the frictions of the various movable parts should be reduced to a minimum.

In order to clearly explain my said invention, I have illustrated same diagramatically in various constructive forms in the accompanying drawings, wherein:

Fig. 6 shows a further constructive form of the gradometer, the pendulum being damped by means of balls rolling on the bottom of the receptacle on either side of the pendulum paddle.

Figs. 7–10 show a gradometer similar to that shown in Figs. 1 and 2, provided with an additional device for quickly moving back the paddle in its vertical position when a steep upward inclination of the road abruptly follows a horizontal road section or a downward inclination.

Figure 1:
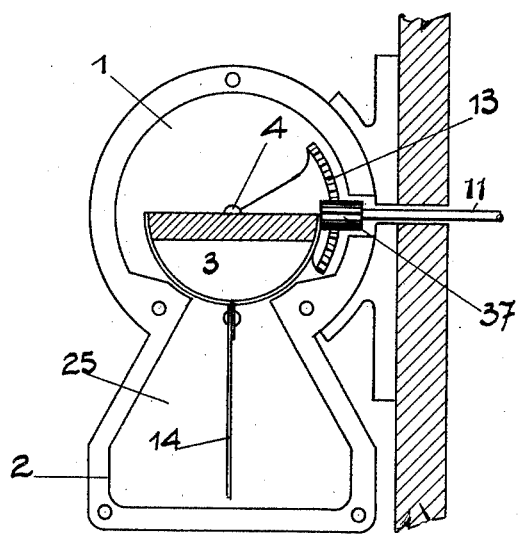
Figs. 1 and 2 show a side elevation partly in section and a vertical section through the suspension shaft of the pendulum according to the invention, with gradometer mechanism and means for rendering the movements of the pendulum substantially independent of the changes of temperature.
Figure 2:
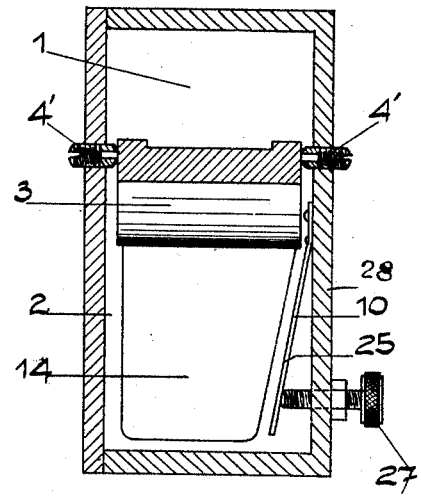

In Figs. 1 and 2, 1 designates the upper compartment of a receptacle 1, 2, in which compartment the shaft 4 of a pendulum is suspended in bearings 4' provided on two opposite walls.

The upper heavy portion 3 of the pendulum is of semi-circular section, whatever may be the position of the rocking pendulum, the semi-circular upper parts of the pendulum glides on the correspondingly curved flanges of the aperture, thus preventing any splashing of the liquid into the upper compartment.

The upper heavy portion 3 of the pendulum is integral with or fixed to a lower, paddle-shaped, light portion 14 dipping into the damping liquid filling the lower trapezoidal compartment 2.

The upper portion 3 of the pendulum is provided with a toothed sector 13 engaging a small pinion 37 mounted on spindle 11 at the opposite end of which is keyed a hand movable in front of a dial (hand and dial not shown), whereby the oscillations of the pendulum are indicated to the driver in a well known manner.

This gradometer is provided with a device for rendering the movements of the pendulum substantially independent of the changes of temperatures, that is, from the viscosity of the liquid in the lower compartment.

The operating speed of the pendulum is adjusted by spaces 10 for the liquid, in which moves the paddle 14; the passage required for oil in its viscous condition in summer is limited on one side by a sheet steel partition wall 25, which closes the inner compartment for the pendulum. Said partition wall, riveted to one of the walls of the lower compartment 2, is held in the position shown in the drawings, by a screw 27, which in cold weather enables said partition wall to spring against the wall of the container by simply loosening said screw. Said partition wall is thus a lining for the wall 28 and the wider outlet will compensate for the lesser fluidity of oil in winter.

In this way, the working of the apparatus will be substantially constant at any temperature.

It may be understood that the liquid in which the pendulum is immersed protects the latter against jerks and shocks of any nature and secures slow and regular operation.

Figure 3:
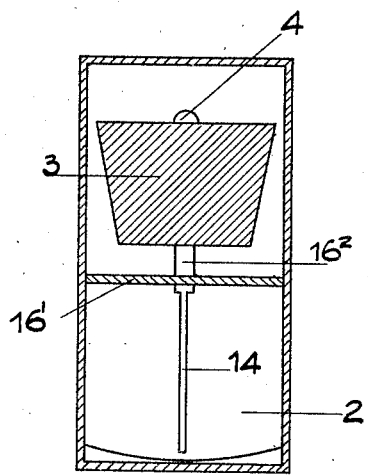
Figs. 3, 4 and 5 show a constructive form of the improved gradometer in longitudinal and transverse section and a top plan view of same.
Figures 4, 5:
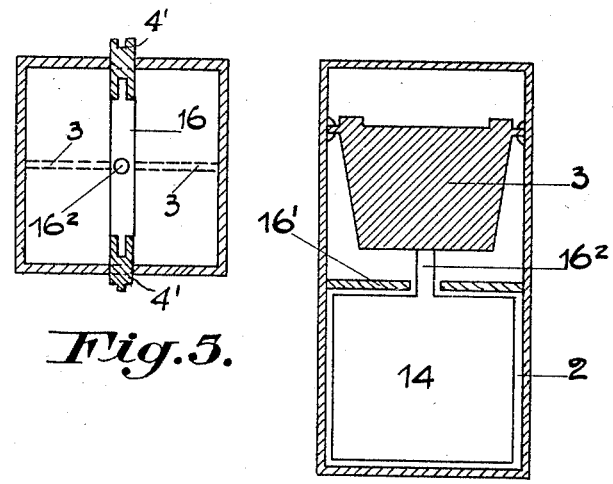

Figs. 3 to 5 show a constructive form of the receptacle of a gradometer in which the two compartments are separated by a partition 16¹ provided with a slot 16 through which extends a rod 16² rigidly connecting the weighted portion 3 of the pendulum with the paddle 14.

The lower trapezoidal compartment 2 is filled with damping liquid up to the partition and the pendulum may freely oscillate, owing to the slot 16, through which extends the connecting rod 16².

Fig. 6 shows a constructive form in which the heavier part 17 of the pendulum is of semi-circular shape, whereas the lower compartment is provided with inner flanges so as to be of trapezoidal shape, in order to prevent the splashing of the liquid filling the lower compartment during the oscillations of the pendulum. Furthermore steel balls 22 are disposed on either side of the paddle 14, said balls, placed on the bottom of the receptacle and rolling on the latter have a stabilizing effect on paddle 14, which may be explained as follows: Experiments have proven that balls immersed in damping liquids lose their vis viva, as they are moved, much more quickly than would the pendulum itself, in proportion to the surfaces immersed in the liquid. If the paddle (Fig. 6) is keeping a given inclination correctly indicated by the gradometer, should a change occur in the speed of the whole device without a change of inclination, the pendulum will have tendency to slightly move in one direction and will engage the corresponding ball or balls; these, on account of the greater frictional resistance they are submitted to, do not move as readily as the paddle and tend to hold it in the correct inclination. The use of balls can be considered as a contrivance by which the size of the molecules of the damping liquid has been enormously increased, thereby increasing the damping effect of the liquid and stabilizing the pendulum.

Figs. 7 to 10 show a gradometer similar to that described in Figs. 1 and 2, provided with a further device for preventing the effect of abrupt changes of inclination of the road.

The liquid in which the paddle of the pendulum is immersed effectively protects the latter against shocks and jerks of any nature and secures slow and regular operation. However if a heavy upward inclination of the road is abruptly followed by a horizontal section or downward inclination, the paddle immersed in the liquid will only be moved slowly back to the vertical position. In order to cause it to promptly follow the horizontal or downwardly inclined section, I make use of a second pendulum.

This second pendulum will be termed hereinafter "free pendulum" because it has no relation with the transmission gear; the pendulum 3 which indicates inclinations of the road, carries the transmission gear and is termed "main pendulum."

The weighted portion 29 of the free pendulum (29, 31) Figs. 7–9, is moved about a supporting shaft 30 rigidly attached to the wall of the apparatus. The main pendulum 3 Figs. 8—9 is integral with its shaft 4, one end of which is journaled in a fixed shaft on shaft 30, while the opposite end thereof is journaled in the wall of the receptacle. The oscillations of both pendulums are therefore independent. Each pendulum has a paddle 31 and 14 respectively and the lower compartment filled with liquid is divided by a partition 32 in two separated parts 2, 2¹.

The partition wall 32 extends over the entire width of the apparatus. Said wall is a sheet iron made integral with the bottom 33, Fig. 7, and is inserted into the apparatus after the free pendulum 29, 31 has been mounted on its bearing. The paddle 31 of the free pendulum is not utilized for obtaining slow operation but merely for damping the displacements of the weight, which could be violent, should no impediment be opposed to them.

In addition the free pendulum serves to rapidly move the main pendulum back to its normal position after the instrument returns to level position.

On the other hand its assistance being only required in this occurrence, its operation will be limited to half an oscillation; i. e., an upward movement and the corresponding backward movement without passing the position it started from.

Figs. 9-10 illustrate the inclination of the apparatus on a gradient and the vertical position of the free pendulum; if the car runs again on a horizontal section, the projecting portion 34 of the free pendulum will engage the projection 35 secured in the wall; but on the other hand the free pendulum presses during the backward movement on the main pendulum through the agency of a plate 36 (Figs. 9-10) secured to the free pendulum. Therefore during the backward movement to the vertical position past a downward inclination, the free pendulum will not be affected.

The free pendulum having a power calculated to easily overcome the resistance of the main pendulum, acts only during the backward movement to the zero on the dial past a gradient, that is during a quarter of an oscillation. In fact in its displacements at the starting for instance it exceeds the swinging amplitude of the main pendulum and will thus be moved away from the latter without engaging it. Its backward movement to the vertical position is likewise rapid after the car has reached the top or crest of the road.

It will be understood that the invention is not limited to the forms of pendulums and containers described, which have been disclosed merely by way of examples. The invention also contemplates any desired combination of all forms of pendula and receptacles described for the purpose of securing stability of the pendulum on horizontal roads.

What I claim as my invention and desire to secure by Letters Patent is:

1. A gradometer for any vehicle and particularly for motor cars and automobiles, comprising in combination a receptacle fixed to the instrument board of the vehicle and comprising an upper compartment and a lower trapezoidal compartment communicating with the upper compartment by its smaller open base, concave flanges on the rim of said open base, liquid filling the lower compartment, a horizontal shaft journalled within the upper compartment, a pendulum secured on said shaft and comprising an upper weighted portion of curved shape, glidable over the open base and concave flange of the liquid-containing compartment and a lower paddle fixed to said weighted portion and immersed within the liquid of said compartment, gearing connected to and actuated by the said shaft for transmitting the oscillations of the pendulum to a hand moving in front of a dial.

2. In a gradometer for any vehicle and particularly for motor cars and automobiles, the combination of a receptacle secured to the instrument board of the car, at right angles to the axis thereof, a partition dividing said receptacle in two superposed compartments, there being a slot in said partition for the intercommunication of both compartments, a horizontal shaft journalled in opposite walls of the upper compartment, a pendulum secured to said shaft and comprising an upper weighted portion within the upper compartment, a lower paddle shaped portion in the lower compartment and an intermediate rod rigidly connecting both said portions and extending through the said slot in the partition, liquid filling the lower compartment and means for transmitting the oscillations of the pendulum to a hand moving in front of a dial.

3. A gradometer to be applied to any vehicle and particularly to motor cars and automobiles, comprising in combination, a receptacle fixed to the instrument board of the vehicle and formed of two superimposed intercommunicating compartments, a horizontal shaft journalled within the upper compartment, a pendulum secured on said shaft and comprising an upper weighted portion contained in the upper compartment, and a paddle fixed on said weighted portion and projecting into the lower compartment, liquid damping means within said lower compartment for damping the oscillating motions of said paddle, means for preventing the splashing of the liquid damping means into the upper compartment, gearing connected to and actuated by said shaft for transmitting the oscillations of the pendulum to a hand moving in front of a dial, means for rendering the movements of the pendulum independent of the outer temperature and means for preventing undue oscillations which would otherwise be caused by abrupt changes of inclination of the road.

In testimony whereof I have hereunto set my hand.

NESTOR BRAIBANT.